United States Patent [19]

Mews

[11] Patent Number: 5,090,187
[45] Date of Patent: Feb. 25, 1992

[54] PICK-UP ASSEMBLY

[76] Inventor: Kenneth F. Mews, Box 1777, Moose Jaw, Saskatchewan, Canada, S6H 7K8

[21] Appl. No.: 695,530

[22] Filed: May 3, 1991

Related U.S. Application Data

[63] Continuation of Ser. No. 485,881, Feb. 27, 1990, abandoned.

[51] Int. Cl.$^5$ .............................................. A01D 57/04
[52] U.S. Cl. ........................................ 56/364; 56/16.4; 56/119
[58] Field of Search .................. 56/364, 12.5, 14.9, 56/15.6, 16.1, 16.4, 104, 119, 122, 156, 251, 294, DIG. 9, DIG. 10; 460/16

[56] References Cited

U.S. PATENT DOCUMENTS

| | | | |
|---|---|---|---|
| 3,191,372 | 6/1965 | Shepley | 56/364 |
| 3,233,394 | 2/1966 | Lundell | 56/364 |
| 3,962,803 | 6/1976 | O'Brien | 56/294 |
| 4,550,554 | 11/1985 | Lindahl et al. | 56/294 |
| 4,841,718 | 6/1989 | Sund | 56/364 |
| 4,981,013 | 1/1991 | Underwood | 56/364 X |

FOREIGN PATENT DOCUMENTS 0538617 3/1957 Canada .
1130580 8/1982 Canada .

Primary Examiner—Terry Lee Melius

[57] ABSTRACT

An apparatus for assisting in the conveying of a crop that has been cut. The apparatus is designed to be installed in front of a conventional pick-up normally mounted on the platform of a combine, baler or the like. Initial engagement of the downed crop is by this auxiliary pick-up. This pick-up is substantially smaller in diameter than the conventional one, it is mounted so that it can be adjusted to handle various types of crops and land conditions, it has a tooth wear adjustment, the teeth are mounted in an outward spiral from the center to throw out rocks and dirt and the teeth are extremely easy to mount.

14 Claims, 1 Drawing Sheet

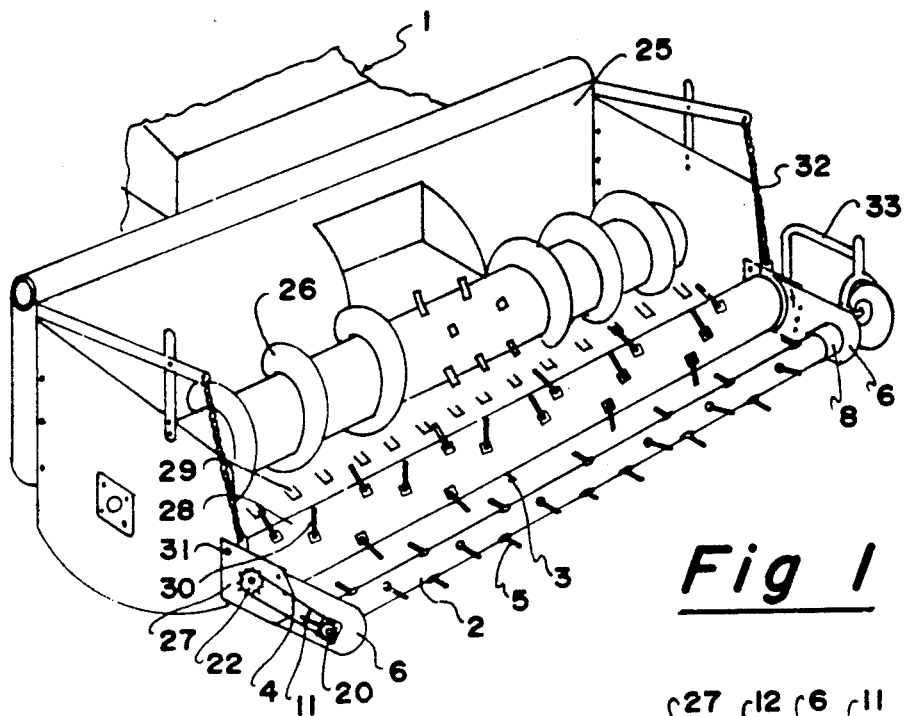
*Fig 1*
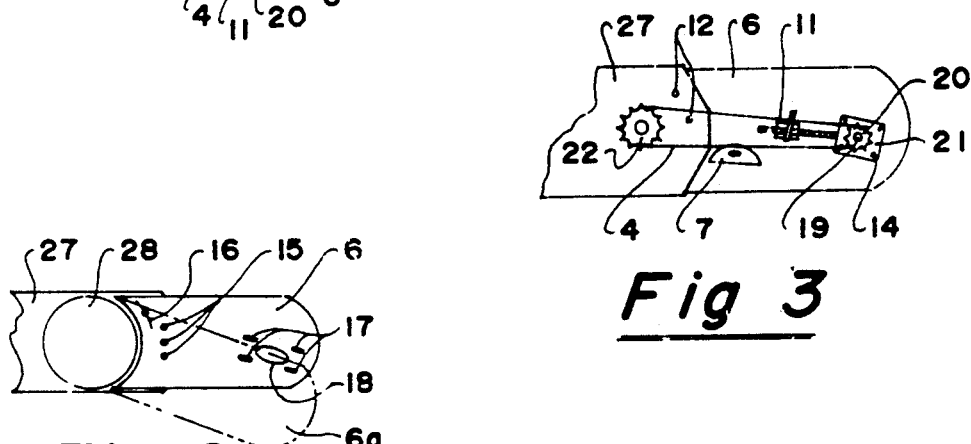
*Fig 3*
*Fig 2*
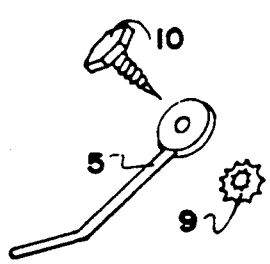
*Fig 5*
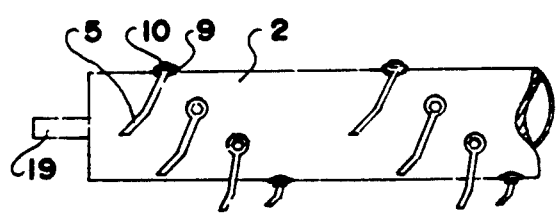
*Fig 4*

PICK-UP ASSEMBLY

This application is a continuation, of Ser. No. 07/485,881 filed on 27 Feb. 90. now abandoned.

BACKGROUND OF INVENTION

This invention relates to an apparatus for picking up a swathed crop and more particularly an apparatus to be installed ahead of a conventional pick-up on a combine, baler or the like and adapted to pick up various crops under various conditions.

The harvesting of crops proceeded from the manual cutting of the crop to a mechanized cutting, curing and harvesting and in the case of grain crops, the threshing of these crops. With the advent of combines and other crop treatment machines it was found advantageous to cut the standing crop, leave it in a windrow and later pick it up with an apparatus to convey it into a machine to process it.

The prior art devices have attempted to pick up the swathed crop as efficiently as possible, however, when the crops were subjected to considerable rain, wind or even snow and were supported by a short stubble they left something to be desired. The closest prior art known to applicant are Canadian Patents 538617, 1130580 and U.S. Pat. Nos. 3191372, 4841718. The angled pick-up shown in "617" claims the angle pick-up as being superior but applicant achieves the same results more efficiently by spiralling the auxiliary pick-up teeth from the center outwardly to each end. The patent "372" teaches the use of a smaller diameter auxiliary pick-up which applicant also found desirable, however, it does not teach the specific tines, the location of the tines, the tine wear adjustments nor the elevation adjustments as taught by applicant, all of which contribute to a far more efficient operation under all conditions.

SUMMARY OF THE INVENTION

The present invention provides an auxiliary pick-up in front of and driven by a conventional or main pick-up mounted on a harvesting machine. This auxiliary pick-up has a rotating drum which is substantially smaller in diameter than the main pick-up drum. On the drum are several flexible, slightly bent teeth simply mounted by a large threaded screw and star shaped locking washer. The teeth are situated so that they present a spiral configuration starting at the center and leading to each dirt to the sides away from the path taken by the crop.

Supporting end plates for the drum are mounted on the conventional pick-up supporting end plates in such a manner as to be pivotably repositionable for best results. The conventional supporting end plates are also pivotable to complement the movement of the auxiliary supporting end plates. The mounting of the auxiliary drum shaft in the auxiliary supporting end plates is accomplished by slidable relocatable bearings at each end. The auxiliary pick-up when mounted as described can handle the most adverse conditions in a most expiditious and reasonable manner.

In view of the above it is therefore an object of the present invention to provide an auxiliary pick-up operating in front of and in series with a conventional pick-up, and which performs well in heavy or light swaths.

A further object of this invention is to provide a smooth flow of a cereal crop into the harvester with as little abuse as possible to prevent shelling of the crop before reaching its appropriate location.

A further object of the present invention is to provide a pick-up capable of running close to the ground in light crops without picking up stones and/or dirt.

Another object of this invention is to provide a pick-up that may be adjusted for varying crops or conditions, or operator preference as well as finger wear.

Another object of this invention is the provision of a pick-up that allows for a fast and easy change of its resilient fingers.

It is a still further object of this invention to provide a sturdy, low cost, high speed pick-up that is especially suited to operate in conjunction with a conventional larger diameter pick-up to enhance its operation.

These and other objects of the present invention will become readily apparent as the following description is read in conjunction with the accompanying drawings wherein like reference numerals indicate like elements throughout the several views.

BRIEF DESCRIPTION OF THE DRAWINGS

FIG. 1 is a perspective view of the invention mounted on a combine with one support wheel removed for clarity.

FIG. 2 is an inside view front elevation and alternate location of the pick-up mounting.

FIG. 3 is an outside view front elevation of the pick-up end mounting with drive and adjusting means.

FIG. 4 is a partial view of the pick-up drum with attached teeth.

FIG. 5 is an exploded view of a tooth with fastening means.

DETAILED DESCRIPTION OF INVENTION

In referring to the drawings in detail it is to be noted that reference to the "conventional pick-up" mounted on the combine platform will be designated as the rear pick-up while reference to applicants new auxiliary pick-up will be referred to as the front pick-up.

Referring now to FIG. 1 there is shown part of a conventional combine body 1 with platform 25 attached thereto, this platform carries an auger 26 that assists in carrying the swathed crop into the combine body. Mounted on the platform 25 is a rear pick-up 3 comprising drum 28 driven from auger 26 and strippers 29 to strip the crop from fingers 30 so that it may be picked up by auger 26. The rear pick-up is pivotably supported on pivot 31 and is pivoted by shortening or lengthening two adjustable flexible supports 32 one at each end of the platform 25. Both the rear and front pick-ups are further supported by a wheel assembly 33 at each end mounted on the rear pick-up supporting end plate 27. The front pick-up supporting end plate 6 is mounted adjacent the rear pick-up supporting end plate 27 by two mounting bolts 12, one passes through plate 27 and slot 16 while the other passes through plate 27 and one of the other holes 15 to place 6 in different locations one of them being shown as 6a. The front pick-up is driven by a drive sprocket 22 mounted on the rear pick-up. A driven sprocket 20 is mounted on the front pick-up drum support shaft 19 and is connected to drive sprocket 22 by drive chain 4. Drive chain tightener 7 takes up any slack in drive chain 4. The front pick-up drum 2 is mounted on the support shaft 19 which is mounted in end supporting bearings 21. These bearings 21 are slidable mounted in supporting end plates 6 by means of bolts 14 in slots 17. The axle 19 being accomodated by elongated openings 18 one in each supporting end plate 6. Adjusting means 11 at each end are fastened to drum shaft supporting bearings 21 and are fixed to supporting end plates 6 by a threaded bolt with adjusting nuts. Adjustment of the nuts moves the supporting bearings 12 along slots 17 to move the front drum 2 farther or closer to drum 28 of the rear pick-up. The front drum has mounted thereon flexible fingers 5 which are curved slightly near the outer end. The fingers are mounted by placing a star washer 9 on the drum 2 between the drum 2 and finger 5, then inserting a strong coarse self tapping screw through the finger, washer and into the drum predetermined size holes being drilled in the drum 2 prior to mounting.

OPERATION OF INVENTION

In operation the harvester pick-ups are first adjusted to best handle the different swaths and land conditions, for example, in a heavy swath the rear pick-up is moderately tilted downwardly with the first pick-up aligned in the same tilted position, in a fluffy type swath the rear pick-up is tilted more with the front pick-up basically level, in a light swath the rear pick-up is basically level with a considerable downward tilt to the front pick-up. With the pick-ups properly adjusted for incline an engagement of the swath by the smaller diameter first pick-up easily moves even the poorest of swaths upwardly and rearwardly to a point where the swath is engaged by the rear pick-up teeth. The front pick-up teeth should also be adjusted initially forward or back so that any failure of continuous swath movement due to worn teeth or maladjustment is avoided. The swath having now reached the rear pick-up is carried rearwardly until stripped off its fingers and directed between the platform auger and the platform where it is carried to the center of the platform and carried into the machine where it will be processed. Without the use of applicants invention may times the crop will be directed on top of the auger with resultant problems. Stones or dirt that may have been contacted by the front pick-up will be cast aside due to the spiral location of the fingers. Since fingers and teeth are used interchangeably in the pick-up art such will be found throughout this disclosure.

Various modifications such as size, shape and arrangement of components may be made without departing from the spirit and scope of this invention. The accompanying specification shall be interpreted as illustrative only and limited only by the scope of the invention as defined in the following claims.

What I claim is:

1. An auxiliary pick-up assembly used in front of and in conjunction with a conventional or main pick-up mounted on a feeder platform of a harvesting machine, said conventional pick-up including supporting end plates mounting it on the platform and carrying drum means with teeth mounted thereon and strippers, for assisting in the conveying of a swathed crop, said auxiliary pick-up assembly comprising pivotably adjustable end plates mounted on the end plates of the conventional pick-up, drum means substantially smaller in diameter than the conventional pick-up drum means and adjustably mounted on the pivotably adjustable end plates, tooth means mounted on the smaller drum means for initial engagement of the crop, and drive means for rotating the smaller drum whereby the crop is picked up by the auxiliary pick-up and transported to the main pick-up and onto the feeder platform of the harvester in a uniform and expiditious manner.

2. An auxiliary pick-up assembly as defined in claim 1 wherein the smaller diameter drum is approximately one half the diameter of the conventional pick-up drum.

3. An auxiliary pick-up assembly as defined in claim 1 wherein the pivotably adjustable end plates have a slot and several openings to provide for the several fixed adjusted locations.

4. An auxiliary pick-up assembly as defined in claim 3 wherein the adjustably mounted drum means includes a drum mounting shaft with bearings thereon, said bearings being slidably mounted on the pivotally adjustable end plates.

5. An auxiliary pick-up assembly as defined in claim 4 wherein the slidably mounted bearings are slidably adjusted by threaded means attached thereto and threadably fastened to the pivotally adjustable end plates.

6. An auxiliary pick-up assembly as defined in claim 2 wherein the tooth means on the smaller diameter drum spiral outwardly towards the end starting from the center.

7. An auxiliary pick-up as defined in claim 6 wherein the drive means on the smaller drum is a chain and sprocket driven by a sprocket on the conventional pick-up drum.

8. Apparatus for conveying a swathed crop to a harvester platform comprising in combination: a first pick-up means for initial gathering of the swath, a second pick-up means to transfer the swath from the first pick-up toward the harvester, and harvester feeder means to receive the swath from the second pick-up for processing in the harvester, said first pick-up being adjustable forwardly and rearwardly relative to said second pick-up means to compensate for tooth wear to ensure continuous rearward crop movement and pivotably adjustable vertically to compensate for crop and land conditions, said first pick-up being mounted on the second pick-up, the second pick-up being pivotably adjustably mounted on the harvester feeder to compensate for crop conditions.

9. Apparatus as claimed in claim 8, wherein the first pick-up means is adjustable forwardly and rearwardly by a screw threaded means and wherein the first pick-up includes a drum and the second pick-up includes a drum, the first drum being substantially smaller in diameter than the second drum.

10. Apparatus as claimed in claim 9 wherein the first pick-up has a series of pick-up teeth mounted on the first pick-up drum which spiral oppositely outwardly to each end from the center.

11. Apparatus as claimed in claim 10 wherein the first pick-up is driven from the second pick-up.

12. Apparatus as claimed in claim 8 wherein the first pick-up is mounted on the second pick-up by supporting end plates and the second pick-up is mounted on the harvester by supporting end plates, the supporting end plates of the first pick-up being mounted on the second pick-up supporting end plates.

13. Apparatus as claimed in claim 12 further including second pick-up supporting end plate flexible adjustable supporting means.

14. Apparatus as claimed in claim 13 further including ground engaging support means mounted on each end of the second pick-up to assist the flexible adjustable supporting means.

* * * * *